(12) United States Patent
Wentzel

(10) Patent No.: US 10,350,740 B2
(45) Date of Patent: Jul. 16, 2019

(54) PLIERS TO SEPARATE OSMOSIS MEMBRANES

(71) Applicant: Raymond Ronald Wentzel, Denver, PA (US)

(72) Inventor: Raymond Ronald Wentzel, Denver, PA (US)

(*) Notice: Subject to any disclaimer, the term of this patent is extended or adjusted under 35 U.S.C. 154(b) by 221 days.

(21) Appl. No.: 15/661,492

(22) Filed: Jul. 27, 2017

(65) Prior Publication Data
US 2019/0030699 A1    Jan. 31, 2019

(51) Int. Cl.
*B25B 27/14* (2006.01)
*B25B 7/02* (2006.01)
*B01D 61/10* (2006.01)
*B01D 65/00* (2006.01)

(52) U.S. Cl.
CPC ............. *B25B 27/14* (2013.01); *B25B 7/02* (2013.01); *B01D 61/10* (2013.01); *B01D 65/00* (2013.01); *B01D 2313/56* (2013.01)

(58) Field of Classification Search
CPC .................. B25B 27/14; B25B 7/02
See application file for complete search history.

(56) References Cited

U.S. PATENT DOCUMENTS

| | | | | |
|---|---|---|---|---|
| 5,630,345 A | * | 5/1997 | Ciccotelli | B25B 7/04 81/373 |
| 9,855,644 B2 | * | 1/2018 | Liu | B25B 7/02 |
| 2018/0264634 A1 | * | 9/2018 | Yontz | B25B 27/10 |

* cited by examiner

*Primary Examiner* — David B. Thomas
(74) *Attorney, Agent, or Firm* — Dunlap Bennett & Ludwig PLLC

(57) ABSTRACT

A pair of pliers for separating osmosis membranes. The pliers include a first arm and a second arm each having a handle end opposite a front end. A first plate includes a top surface, a bottom surface and an edge having a front, a rear and sides. The rear of the first plate is coupled to the front end of the first arm and the front of the first plate includes a taper formed on the top surface. A second plate includes a top surface, a bottom surface and an edge having a front, a rear and sides. The rear of the second plate is coupled to the front end of the second arm and the front of the second plate includes a taper formed on the bottom surface. A pivot pin pivotally secures the first arm to the second arm in between the front ends and the handle ends.

8 Claims, 2 Drawing Sheets

PLIERS TO SEPARATE OSMOSIS MEMBRANES

BACKGROUND OF THE INVENTION

The present invention relates to pliers and, more particularly, to pliers used to separate wet osmosis membranes.

Reverse osmosis (RO) is a water purification technology that uses a semipermeable membrane to remove ions, molecules, and larger particles from drinking water. The membrane assembly consists of a pressure vessel with a membrane that allows feedwater to be pressed against it. The membrane must be strong enough to withstand whatever pressure is applied against it. Reverse osmosis membranes are made in a variety of configurations, with the two most common configurations being spiral-wound and hollow-fiber.

The reverse osmosis membranes are pulled apart and separated from coupling O-rings when repaired or replaced. Separating wet osmosis membranes is challenging.

As can be seen, there is a need for a device that separates wet osmosis membranes.

SUMMARY OF THE INVENTION

In one aspect of the present invention, a pair of pliers comprises:
a first arm comprising a front end opposite a handle end;
a second arm comprising a front end opposite a handle end;
a first plate comprising a top surface, a bottom surface and an edge having a front, a rear and sides, wherein the rear is coupled to the front end of the first arm, and the front comprises a taper;
a second plate comprising a top surface, a bottom surface and an edge comprising a front, a rear and sides, wherein the rear is coupled to the front end of the second arm, and the front comprises a taper; and
a pivot pin pivotally securing the first arm to the second arm in between the front ends and the handle ends.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1:
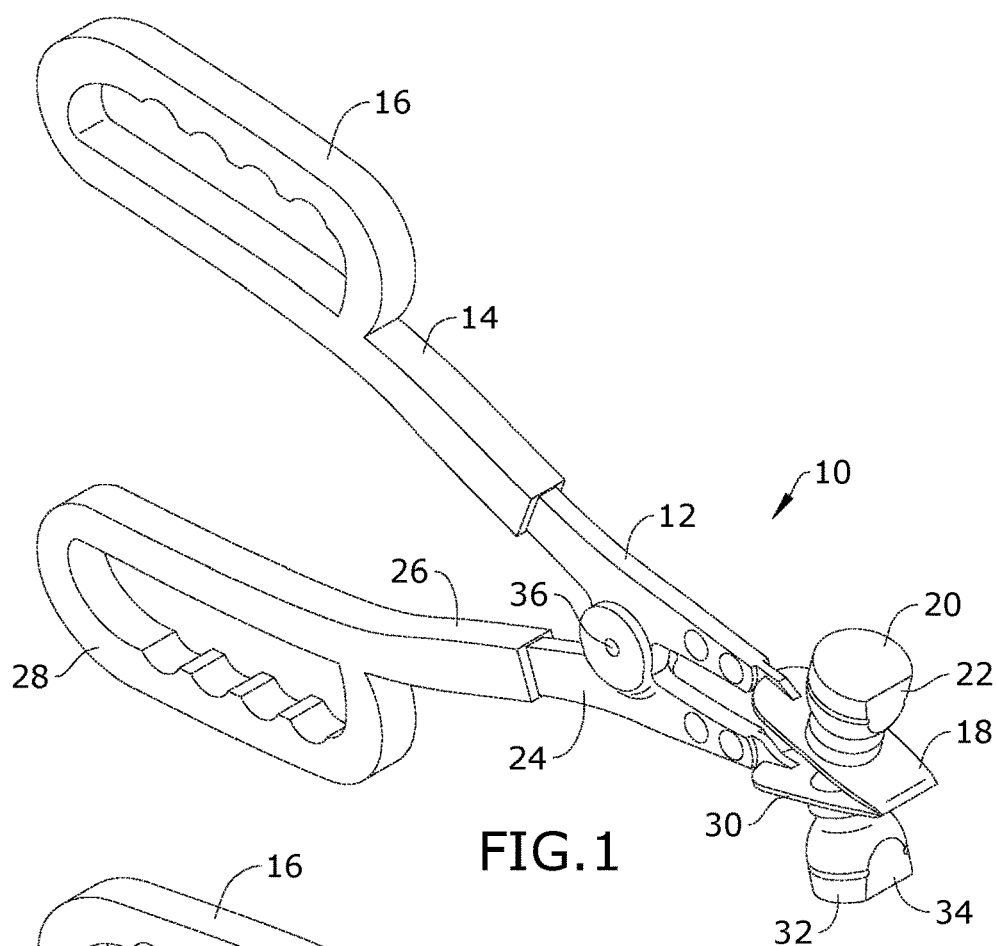
FIG. 1 is a perspective view of an embodiment of the present invention in a closed insertion configuration.
Figure 2:
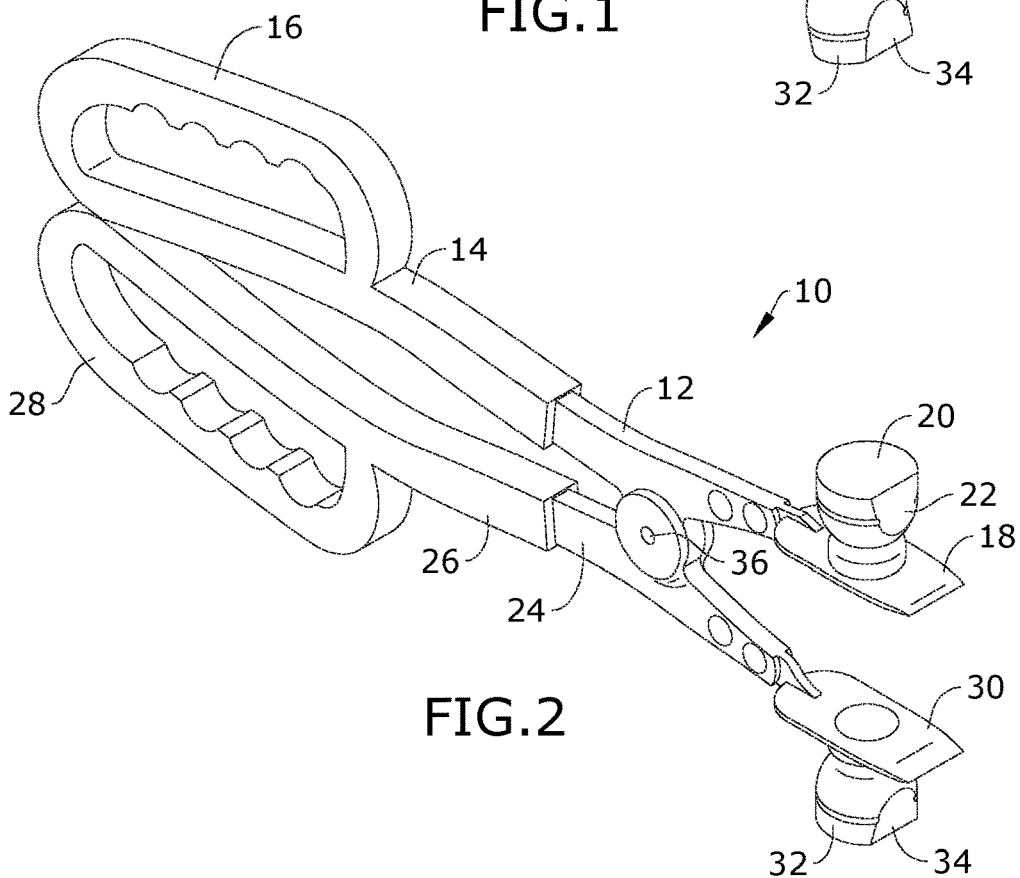
FIG. 2 is a perspective view of an embodiment of the present invention in an open separating configuration.
Figure 3:
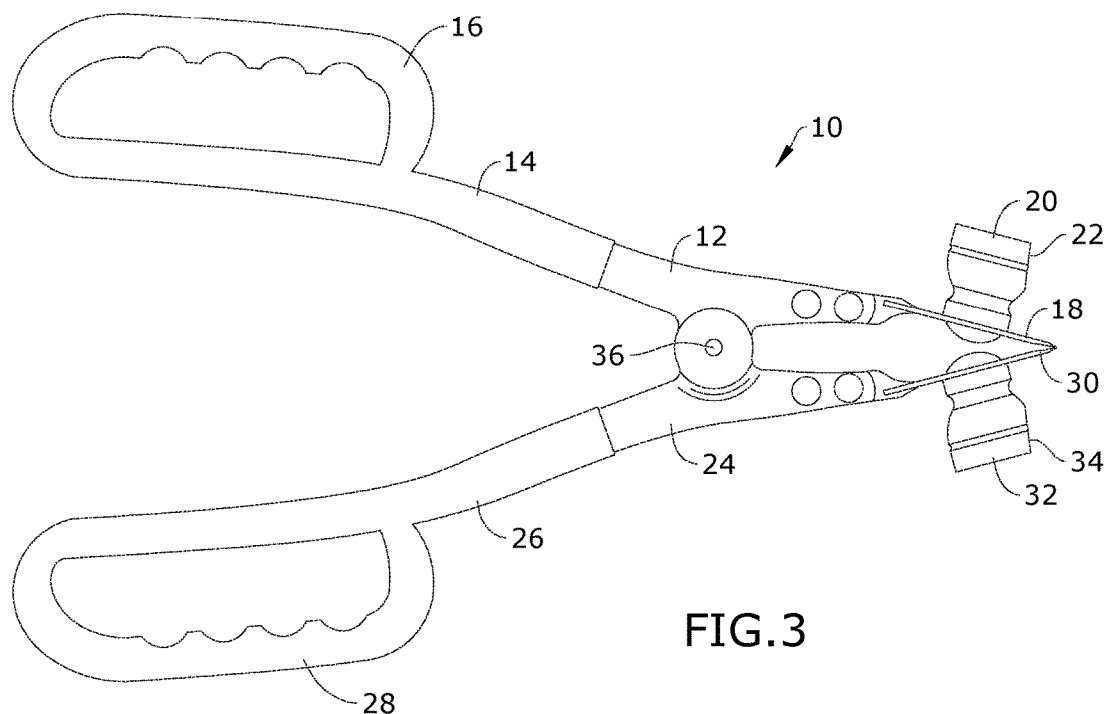
FIG. 3 is a side view of an embodiment of the present invention in a closed insertion configuration.
Figure 4:
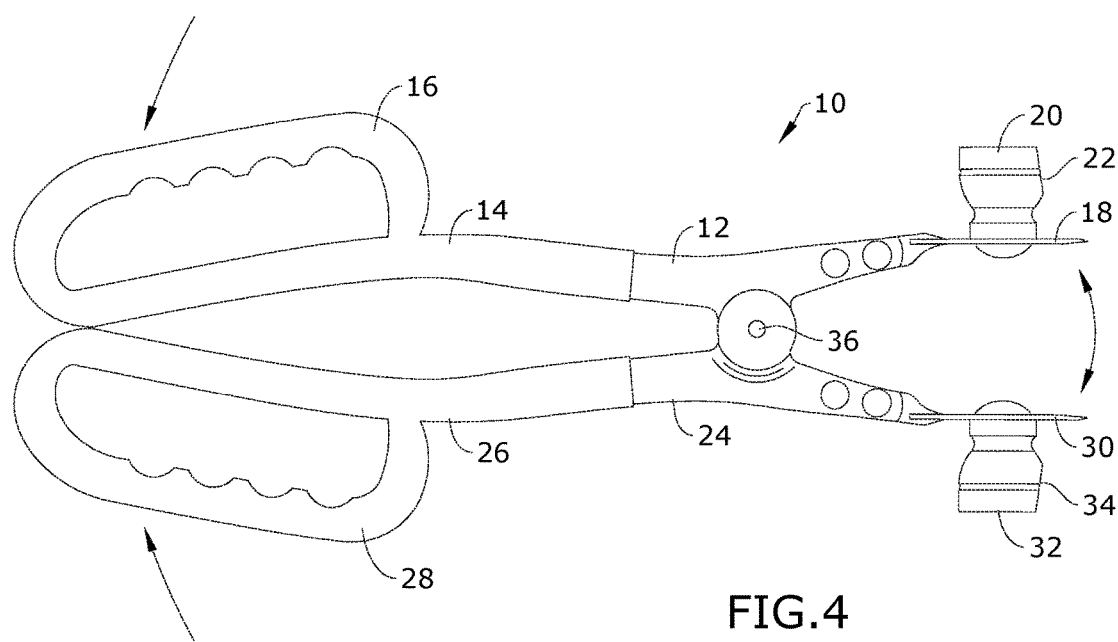
FIG. 4 is a side view of an embodiment of the present invention in an open separating configuration.

Referring to FIGS. 1 through 4, the present invention includes a pair of pliers 10. The pliers 10 include a first arm 12 having a handle end 14 opposite a front end. The pliers 10 further include a second arm 24 having a handle end 26 opposite a front end. A first plate 18 includes a top surface, a bottom surface and an edge having a front, a rear and sides. The rear of the first plate 18 is coupled to the front end of the first arm 12 and the front of the first plate 18 includes a taper. A second plate 30 includes a top surface, a bottom surface and an edge having a front, a rear and sides. The rear of the second plate 30 is coupled to the front end of the second arm 24 and the front of the second plate 30 includes a taper. A pivot pin 36 pivotally secures the first arm 12 to the second arm 24 in between the front ends and the handle ends 14, 26.

The first plate 18 and the second plate 30 may be made of a flat rigid material, such as metal or a strong polymer. In certain embodiments, the first plate 18 may include a taper on the top and/or bottom surfaces at the front and the second plate 18 may include a taper on the top and/or bottom surfaces at the front. The taper forms a point so that the plates 18, 20 may be inserted in between osmosis membranes. The top surface of the second plate 30 is facing the bottom surface of the first plate 18.

The present invention may further include a closed insertion configuration and an open separation configuration. The closed insertion configuration includes the first plate 18 and the second plate 30 pivoted towards one another forming an acute angle relative to one another. The closed insertion configuration may further include the handle ends 14, 26 pivoted away from one another. The open separation configuration includes the first plate 18 and the second plate 30 pivoted away from one another and substantially parallel relative to one another. A user may convert the pliers from the closed insertion configuration to the open separation configuration by pushing the handle ends 14, 26 together. For example, the tapered ends of the plates 18, 30 may be inserted in between a membrane and a gasket. The user may then push the handle ends 14, 26 together, thereby separating the membrane from the gasket.

The present invention may further include a first looped handle grip 16 protruding from an upper portion of the handle end 14 of the first arm 12 and a second looped handle grip 28 protruding from a lower portion of the handle end 26 of the second arm 24. The first looped handle grip 16 and the second looped handle grip 28 may each include a plurality of finger grooves formed on an inner edge.

The present invention may further include a first protrusion 20 extending from the top surface of the first plate 18 and a second protrusion 32 extending from the bottom surface of the second plate 30. The first protrusion 20 may include a flat front surface 22 and the second protrusion 32 may include a flat front surface 34. Each of the flat front surfaces 22, 34 may face towards the front ends of the first and second plates 18, 30. Further, the flat front surface 22 of the first protrusion 20 may be substantially perpendicular with the top surface of the first plate 18 and the flat front surface 22 of the second protrusion 32 may be substantially perpendicular with the bottom surface of the second plate 30. The first protrusion 20 and the second protrusion 32 may each have a bell shape. The protrusions 20, 34 may help support the membranes during the separation and removal process.

It should be understood, of course, that the foregoing relates to exemplary embodiments of the invention and that modifications may be made without departing from the spirit and scope of the invention as set forth in the following claims.

What is claimed is:

1. A pair of pliers comprising:
a first arm comprising a front end opposite a handle end;
a second arm comprising a front end opposite a handle end;
a first plate comprising a top surface, a bottom surface and an edge having a front, a rear and sides, wherein the rear is coupled to the front end of the first arm, and the front comprises a taper;
a second plate comprising a top surface, a bottom surface and an edge comprising a front, a rear and sides, wherein the rear is coupled to the front end of the second arm, and the front comprises a taper; and
a pivot pin pivotally securing the first arm to the second arm in between the front ends and the handle ends.

2. The pair of pliers of claim 1, wherein the first plate and the second plate are each substantially flat, wherein the top surface of the second plate is facing the bottom surface of the first plate.

3. The pair of pliers of claim 1, comprising a closed insertion configuration and an open separation configuration, wherein the closed insertion configuration comprises the first plate and the second plate pivoted towards one another forming an acute angle relative to one another and the open separation configuration comprises the first plate and the second plate pivoted away from one another and substantially parallel relative to one another.

4. The pair of pliers of claim 1, further comprising a first looped handle grip protruding from an upper portion of the handle end of the first arm and a second looped handle grip protruding from a lower portion of the handle end of the second arm.

5. The pair of pliers of claim 4, wherein the first looped handle grip and the second looped handle grip each comprise a plurality of finger grooves formed on an inner edge.

6. The pair of pliers of claim 1, further comprising a first protrusion extending from the top surface of the first plate and a second protrusion extending from the bottom surface of the second plate.

7. The pair of pliers of claim 6, wherein the first protrusion and the second protrusion each comprise a flat front surface facing towards the front ends of the first and second plates.

8. The pair of pliers of claim 6, wherein the first and second protrusions each have a bell shape.

* * * * *